US008543338B2

(12) United States Patent
Bronstein et al.

(10) Patent No.: US 8,543,338 B2
(45) Date of Patent: Sep. 24, 2013

(54) SYSTEM AND METHOD FOR PERFORMING COMPUTERIZED SIMULATIONS FOR IMAGE-GUIDED PROCEDURES USING A PATIENT SPECIFIC MODEL

(75) Inventors: Ran Bronstein, Modiin (IL); Niv Fisher, Tel Aviv (IL); Ofek Shilon, Kafar Sava (IL); Einav Namer, Tel Aviv (IL)

(73) Assignee: Simbionix Ltd., Lod (IL)

( * ) Notice: Subject to any disclaimer, the term of this patent is extended or adjusted under 35 U.S.C. 154(b) by 198 days.

(21) Appl. No.: 12/405,954

(22) Filed: Mar. 17, 2009

(65) Prior Publication Data

US 2009/0177454 A1 Jul. 9, 2009

Related U.S. Application Data

(63) Continuation-in-part of application No. 12/224,314, filed as application No. PCT/IL2008/000056 on Jan. 13, 2008.

(60) Provisional application No. 60/880,415, filed on Jan. 16, 2007.

(51) Int. Cl.
G06F 19/00 (2011.01)
G06K 9/20 (2006.01)

(52) U.S. Cl.
USPC .............. 702/19; 382/282; 382/286; 382/128

(58) Field of Classification Search
None
See application file for complete search history.

(56) References Cited

U.S. PATENT DOCUMENTS

| | | | |
|---|---|---|---|
| 1,959,490 A | 5/1934 | Mistelski | |
| 3,024,539 A | 3/1962 | Rider | |
| 3,263,824 A | 8/1966 | Jones et al. | |
| 3,406,601 A | 10/1968 | Clifford | |
| 3,490,059 A | 1/1970 | Paulsen et al. | |
| 3,517,446 A | 6/1970 | Corlyon et al. | |
| 3,520,071 A | 7/1970 | Abrahamson et al. | |
| 3,573,444 A | 4/1971 | Kawabata et al. | |
| 3,579,842 A | 5/1971 | Scher | |
| 3,704,529 A | 12/1972 | Cioppa | |
| 3,722,108 A | 3/1973 | Chase | |
| 3,739,276 A | 6/1973 | Dornberger | |
| 3,775,865 A | 12/1973 | Rowan | |
| 3,789,518 A | 2/1974 | Chase | |
| 3,795,061 A | 3/1974 | Sarnoff et al. | |
| 3,795,150 A | 3/1974 | Eckhardt | |
| 3,814,145 A | 6/1974 | Gott et al. | |
| 3,861,065 A | 1/1975 | Courtenay et al. | |
| 3,875,488 A | 4/1975 | Crocker et al. | |
| 3,919,691 A | 11/1975 | Noll | |
| 3,945,593 A | 3/1976 | Schanzer | |
| 3,991,490 A | 11/1976 | Markman | |
| 4,024,473 A | 5/1977 | Edge et al. | |
| 4,024,873 A | 5/1977 | Antoshkiw et al. | |
| 4,033,331 A | 7/1977 | Guss et al. | |
| 4,078,317 A | 3/1978 | Wheatley et al. | |
| 4,089,494 A | 5/1978 | Anderson et al. | |
| 4,115,755 A | 9/1978 | Cotton | |
| 4,136,554 A | 1/1979 | Larson | |
| 4,148,014 A | 4/1979 | Burson | |
| 4,162,582 A | 7/1979 | McGraw et al. | |
| 4,177,984 A | 12/1979 | Douglas et al. | |
| 4,182,054 A | 1/1980 | Wise et al. | |
| 4,183,249 A | 1/1980 | Anderson | |
| 4,227,319 A | 10/1980 | Guy et al. | |
| 4,236,685 A | 12/1980 | Kissel | |
| 4,250,636 A | 2/1981 | Horwitz | |
| 4,250,887 A | 2/1981 | Dardik et al. | |
| 4,262,549 A | 4/1981 | Schwellenbach | |
| 4,264,312 A | 4/1981 | Cianci | |
| 4,276,702 A | 7/1981 | Horwitz | |
| 4,307,539 A | 12/1981 | Klein | |
| 4,333,070 A | 6/1982 | Barnes | |
| 4,334,216 A | 6/1982 | Lacroix | |
| 4,360,345 A | 11/1982 | Hon | |
| 4,398,889 A | 8/1983 | Lam et al. | |
| 4,427,388 A | 1/1984 | Hope | |
| 4,436,188 A | 3/1984 | Jones | |
| 4,459,113 A | 7/1984 | Boscaro Gatti et al. | |
| 4,464,117 A | 8/1984 | Foerst | |

(Continued)

FOREIGN PATENT DOCUMENTS

EP 0 147 516 3/1988
EP 0 265 011 4/1988

(Continued)

OTHER PUBLICATIONS

Levy (2001) ACM SIGGRAPH, Aug. 12-17, Los Angeles, CA, pp. 417-424).*
International Search Report for International Publication No. PCT/IL2010/00172 date of mailing Jun. 17, 2010.
Wierzbicki et al. Four-Dimensional Modeling of the Heart for Image Guidance of Minimally Invasive Cardiac Surgeries. Medical Imaging 2004: Visualization, Image-Guided Procedures, and Display. vol. 5367, May 2004 pp. 302-311 XP-002512099.
Gering et al. An Integrated Visualization System for Surgical Planning and Guidance Using Image Fusion and Interventional Imaging. Medical Image Computing and Computer Assisted Intervention— MIC CAI' 99 Lecture Notes in Computer Science, LNCS, Springer, Berlin, DE. vol. 1679, Jan. 1, 2006 pp. 809-820 XP019036236 MIT AI Laboratory, Cambridge MA, USA Bringham & Women's Hospital, Harvard Medical School, Boston MA, USA.

(Continued)

Primary Examiner — Loria A Clow
(74) Attorney, Agent, or Firm — Pearl Cohen Zedek Latzer, LLP

(57) ABSTRACT

Embodiments of the invention are directed to a method of performing computerized simulations of image-guided procedures. The method may include producing a digital image-based model of an anatomical structure based on medical image data, producing, based on the image-based model and extrapolated data, an extended model that represents the anatomical structure and adjacent anatomical regions not included in the medical image data, displaying a graphical representation of the extended model and performing a computerized simulation of an image-guided procedure using the extended model.

20 Claims, 9 Drawing Sheets

(56) References Cited

U.S. PATENT DOCUMENTS

| | | |
|---|---|---|
| 4,478,407 A | 10/1984 | Manabe |
| 4,481,001 A | 11/1984 | Graham et al. |
| 4,504,233 A | 3/1985 | Galus et al. |
| 4,513,235 A | 4/1985 | Acklam et al. |
| 4,545,390 A | 10/1985 | Leary |
| 4,550,617 A | 11/1985 | Fraignier et al. |
| 4,551,101 A | 11/1985 | Neumann |
| 4,573,452 A | 3/1986 | Greenberg |
| 4,599,070 A | 7/1986 | Hladky et al. |
| 4,604,016 A | 8/1986 | Joyce |
| 4,605,373 A | 8/1986 | Rosen |
| 4,632,341 A | 12/1986 | Repperger et al. |
| 4,642,055 A | 2/1987 | Saliterman |
| 4,646,742 A | 3/1987 | Packard et al. |
| 4,654,648 A | 3/1987 | Herrington et al. |
| 4,655,673 A | 4/1987 | Hawkes |
| 4,659,313 A | 4/1987 | Kuster et al. |
| 4,667,182 A | 5/1987 | Murphy |
| 4,688,983 A | 8/1987 | Lindbom |
| 4,706,006 A | 11/1987 | Solomon |
| 4,708,650 A | 11/1987 | Holewinski et al. |
| 4,708,656 A | 11/1987 | de Vries et al. |
| 4,712,101 A | 12/1987 | Culver |
| 4,713,007 A | 12/1987 | Alban |
| 4,726,772 A | 2/1988 | Amplatz |
| 4,733,214 A | 3/1988 | Andresen |
| 4,742,815 A | 5/1988 | Ninan et al. |
| 4,748,984 A | 6/1988 | Patel |
| 4,751,662 A | 6/1988 | Crosbie |
| 4,757,302 A | 7/1988 | Hatakeyama et al. |
| 4,769,763 A | 9/1988 | Trieb et al. |
| 4,775,289 A | 10/1988 | Kazerooni |
| 4,782,327 A | 11/1988 | Kley et al. |
| 4,786,892 A | 11/1988 | Kubo et al. |
| 4,789,340 A | 12/1988 | Zikria |
| 4,794,384 A | 12/1988 | Jackson |
| 4,795,296 A | 1/1989 | Jau |
| 4,797,104 A | 1/1989 | Laerdal et al. |
| 4,803,413 A | 2/1989 | Kendig et al. |
| 4,820,162 A | 4/1989 | Ross |
| 4,823,634 A | 4/1989 | Culver |
| 4,825,875 A | 5/1989 | Ninan et al. |
| 4,839,838 A | 6/1989 | LaBiche et al. |
| 4,857,881 A | 8/1989 | Hayes |
| 4,860,215 A | 8/1989 | Seraji |
| 4,865,423 A | 9/1989 | Doi |
| 4,867,685 A | 9/1989 | Brush et al. |
| 4,868,549 A | 9/1989 | Affinito et al. |
| 4,870,964 A | 10/1989 | Bailey, Jr. et al. |
| 4,874,998 A | 10/1989 | Hollis, Jr |
| H703 H | 11/1989 | Repperger et al. |
| 4,879,556 A | 11/1989 | Duimel |
| 4,881,324 A | 11/1989 | Khinchuk |
| 4,885,565 A | 12/1989 | Embach |
| 4,887,966 A | 12/1989 | Gellerman |
| 4,891,764 A | 1/1990 | McIntosh |
| 4,896,554 A | 1/1990 | Culver |
| 4,907,796 A | 3/1990 | Roel-Rodriguez |
| 4,907,970 A | 3/1990 | Meenen |
| 4,907,973 A | 3/1990 | Hon |
| 4,909,232 A | 3/1990 | Carella |
| 4,912,638 A | 3/1990 | Pratt |
| 4,930,770 A | 6/1990 | Baker |
| 4,934,694 A | 6/1990 | McIntosh |
| 4,940,234 A | 7/1990 | Ishida et al. |
| 4,949,119 A | 8/1990 | Moncrief et al. |
| 4,955,654 A | 9/1990 | Tsuchihashi et al. |
| 4,961,138 A | 10/1990 | Gorniak |
| 4,961,267 A | 10/1990 | Herzog |
| 4,964,097 A | 10/1990 | Wang et al. |
| 4,975,546 A | 12/1990 | Craig |
| 4,982,618 A | 1/1991 | Culver |
| 4,982,918 A | 1/1991 | Kaye |
| 4,998,916 A | 3/1991 | Hammerslag et al. |
| 5,004,391 A | 4/1991 | Burdea |
| 5,007,300 A | 4/1991 | Siva |
| 5,009,598 A | 4/1991 | Bennington |
| 5,018,922 A | 5/1991 | Yoshinada et al. |
| 5,019,761 A | 5/1991 | Kraft |
| 5,021,982 A | 6/1991 | Crosbie et al. |
| 5,022,384 A | 6/1991 | Freels et al. |
| 5,033,352 A | 7/1991 | Kellogg et al. |
| 5,044,956 A | 9/1991 | Behensky et al. |
| 5,048,508 A | 9/1991 | Storz |
| 5,057,078 A | 10/1991 | Foote et al. |
| 5,062,594 A | 11/1991 | Repperger |
| 5,072,361 A | 12/1991 | Davis et al. |
| 5,077,769 A | 12/1991 | Franciose |
| 5,078,152 A | 1/1992 | Bond et al. |
| 5,086,296 A | 2/1992 | Clark |
| 5,103,404 A | 4/1992 | McIntosh |
| 5,104,328 A | 4/1992 | Lounsbury |
| 5,112,228 A | 5/1992 | Zouras |
| 5,116,051 A | 5/1992 | Moncrief et al. |
| 5,116,180 A | 5/1992 | Fung et al. |
| 5,125,843 A | 6/1992 | Holloway |
| 5,126,948 A | 6/1992 | Mitchell et al. |
| 5,135,488 A | 8/1992 | Foote et al. |
| 5,139,261 A | 8/1992 | Openiano |
| 5,142,931 A | 9/1992 | Menahem |
| 5,143,505 A | 9/1992 | Burdea et al. |
| 5,146,566 A | 9/1992 | Hollis, Jr. et al. |
| 5,149,270 A | 9/1992 | McKeown |
| 5,153,716 A | 10/1992 | Smith |
| 5,158,459 A | 10/1992 | Edelberg |
| 5,167,159 A | 12/1992 | Lucking |
| 5,171,299 A | 12/1992 | Heitzmann et al. |
| 5,177,473 A | 1/1993 | Drysdale |
| 5,180,351 A | 1/1993 | Ehrenfried |
| 5,181,181 A | 1/1993 | Glynn |
| 5,184,306 A | 2/1993 | Erdman et al. |
| 5,184,319 A | 2/1993 | Kramer |
| 5,185,561 A | 2/1993 | Good et al. |
| 5,186,629 A | 2/1993 | Rohen |
| 5,189,355 A | 2/1993 | Larkins et al. |
| 5,191,320 A | 3/1993 | MacKay |
| 5,193,963 A | 3/1993 | McAffee et al. |
| 5,196,017 A | 3/1993 | Silva et al. |
| 5,197,003 A | 3/1993 | Moncrief et al. |
| 5,203,563 A | 4/1993 | Loper, III |
| 5,204,600 A | 4/1993 | Kahkoska |
| 5,209,131 A | 5/1993 | Baxter |
| 5,209,661 A | 5/1993 | Hildreth et al. |
| 5,212,473 A | 5/1993 | Louis |
| 5,215,523 A | 6/1993 | Williams et al. |
| 5,220,260 A | 6/1993 | Schuler |
| 5,222,893 A | 6/1993 | Hardesty |
| 5,223,776 A | 6/1993 | Radke et al. |
| 5,228,356 A | 7/1993 | Chuang |
| 5,240,417 A | 8/1993 | Smithson et al. |
| 5,243,266 A | 9/1993 | Kasagami et al. |
| 5,246,007 A | 9/1993 | Frisbie et al. |
| 5,247,432 A | 9/1993 | Ueda |
| 5,252,068 A | 10/1993 | Gryder |
| 5,252,070 A | 10/1993 | Jarrett |
| 5,257,462 A | 11/1993 | Buttermann |
| 5,259,626 A | 11/1993 | Ho |
| 5,259,894 A | 11/1993 | Sampson |
| 5,264,768 A | 11/1993 | Gregory et al. |
| 5,265,034 A | 11/1993 | Breckenridge et al. |
| 5,269,519 A | 12/1993 | Malone |
| 5,275,174 A | 1/1994 | Cook |
| 5,275,565 A | 1/1994 | Moncrief |
| 5,279,309 A | 1/1994 | Taylor |
| 5,279,563 A | 1/1994 | Brucker et al. |
| 5,280,265 A | 1/1994 | Kramer et al. |
| 5,283,970 A | 2/1994 | Aigner |
| 5,286,203 A | 2/1994 | Fuller et al. |
| 5,295,694 A | 3/1994 | Levin |
| 5,296,846 A | 3/1994 | Ledley |
| 5,296,871 A | 3/1994 | Paley |
| 5,305,203 A | 4/1994 | Raab |
| 5,309,140 A | 5/1994 | Everett, Jr. et al. |
| 5,311,422 A | 5/1994 | Loftin et al. |

| | | | | | | |
|---|---|---|---|---|---|---|
| 5,313,230 A | 5/1994 | Venolia et al. | | 5,625,576 A | 4/1997 | Massie et al. |
| 5,313,568 A | 5/1994 | Wallace et al. | | 5,629,594 A | 5/1997 | Jacobus et al. |
| 5,314,339 A | 5/1994 | Aponte | | 5,631,861 A | 5/1997 | Kramer |
| 5,317,689 A | 5/1994 | Nack et al. | | 5,631,973 A | 5/1997 | Green |
| 5,318,533 A | 6/1994 | Adams et al. | | 5,643,087 A | 7/1997 | Marcus et al. |
| 5,324,260 A | 6/1994 | O'Neill et al. | | 5,651,775 A | 7/1997 | Walker et al. |
| 5,327,790 A | 7/1994 | Levin et al. | | 5,657,429 A | 8/1997 | Wang et al. |
| 5,334,027 A | 8/1994 | Wherlock | | 5,661,253 A | 8/1997 | Aoki |
| 5,335,557 A | 8/1994 | Yasutake | | 5,661,667 A | 8/1997 | Rueb et al. |
| 5,344,354 A | 9/1994 | Wiley | | 5,666,473 A | 9/1997 | Wallace |
| 5,353,242 A | 10/1994 | Crosbie et al. | | 5,669,818 A | 9/1997 | Thorner et al. |
| 5,354,162 A | 10/1994 | Burdea et al. | | 5,676,157 A | 10/1997 | Kramer |
| 5,355,148 A | 10/1994 | Anderson | | 5,680,590 A | 10/1997 | Parti |
| 5,364,271 A | 11/1994 | Aknin et al. | | 5,684,722 A | 11/1997 | Thorner et al. |
| 5,366,376 A | 11/1994 | Copperman et al. | | 5,691,898 A | 11/1997 | Rosenberg et al. |
| 5,368,484 A | 11/1994 | Copperman et al. | | 5,694,013 A | 12/1997 | Stewart et al. |
| 5,368,487 A | 11/1994 | Medina | | 5,695,500 A | 12/1997 | Taylor et al. |
| 5,368,565 A | 11/1994 | DeLong | | 5,701,140 A | 12/1997 | Rosenberg et al. |
| 5,370,535 A | 12/1994 | Prendergast | | 5,709,219 A | 1/1998 | Chen et al. |
| 5,371,778 A | 12/1994 | Yanof et al. | | 5,716,016 A | 2/1998 | Iwade et al. |
| 5,379,663 A | 1/1995 | Hara | | 5,720,619 A | 2/1998 | Fisslinger |
| 5,382,885 A | 1/1995 | Salcudean et al. | | 5,724,264 A | 3/1998 | Rosenberg et al. |
| 5,384,460 A | 1/1995 | Tseng | | 5,731,804 A | 3/1998 | Rosenberg |
| 5,385,549 A | 1/1995 | Lampropoulos et al. | | 5,736,978 A | 4/1998 | Hasser et al. |
| 5,389,865 A | 2/1995 | Jacobus et al. | | 5,739,811 A | 4/1998 | Rosenberg et al. |
| 5,396,267 A | 3/1995 | Bouton | | 5,742,278 A | 4/1998 | Chen et al. |
| 5,397,308 A | 3/1995 | Ellis et al. | | 5,749,853 A | 5/1998 | O'Donnell et al. |
| 5,397,323 A | 3/1995 | Taylor et al. | | 5,755,577 A | 5/1998 | Gillio |
| 5,399,091 A | 3/1995 | Mitsumoto | | 5,766,016 A | 6/1998 | Sinclair et al. |
| 5,402,801 A | 4/1995 | Taylor | | 5,769,640 A | 6/1998 | Jacobus et al. |
| 5,403,191 A | 4/1995 | Tuason | | 5,771,181 A | 6/1998 | Moore et al. |
| 5,412,189 A | 5/1995 | Cragun | | 5,776,050 A | 7/1998 | Chen et al. |
| 5,412,880 A | 5/1995 | Raab | | 5,776,126 A | 7/1998 | Wilk et al. |
| 5,414,337 A | 5/1995 | Schuler | | 5,781,172 A | 7/1998 | Engel et al. |
| 5,423,754 A | 6/1995 | Cornelius et al. | | 5,797,900 A | 8/1998 | Madhani et al. |
| 5,425,644 A | 6/1995 | Szinicz | | 5,800,179 A | 9/1998 | Bailey |
| 5,425,709 A | 6/1995 | Gambale | | 5,805,140 A | 9/1998 | Rosenberg et al. |
| 5,428,748 A | 6/1995 | Davidson et al. | | 5,806,521 A | 9/1998 | Morimoto et al. |
| 5,429,140 A | 7/1995 | Burdea et al. | | 5,807,377 A | 9/1998 | Madhani et al. |
| 5,430,665 A | 7/1995 | Jin et al. | | 5,808,665 A | 9/1998 | Green |
| 5,436,640 A | 7/1995 | Reeves | | 5,810,007 A | 9/1998 | Holupka et al. |
| 5,445,166 A | 8/1995 | Taylor | | 5,821,920 A | 10/1998 | Rosenberg et al. |
| 5,451,924 A | 9/1995 | Massimino et al. | | 5,831,408 A | 11/1998 | Jacobus et al. |
| 5,459,382 A | 10/1995 | Jacobus et al. | | 5,844,392 A | 12/1998 | Peurach et al. |
| 5,461,711 A | 10/1995 | Wang et al. | | 5,882,206 A | 3/1999 | Gillio |
| 5,467,441 A | 11/1995 | Stone et al. | | 5,889,670 A | 3/1999 | Schuler et al. |
| 5,467,763 A | 11/1995 | McMahon et al. | | 5,889,672 A | 3/1999 | Schuler et al. |
| 5,470,232 A | 11/1995 | Kelso et al. | | 5,930,741 A | 7/1999 | Kramer |
| 5,473,235 A | 12/1995 | Lance et al. | | 5,945,978 A | 8/1999 | Holmes |
| 5,482,051 A | 1/1996 | Reddy et al. | | 5,956,484 A | 9/1999 | Rosenberg et al. |
| 5,492,530 A | 2/1996 | Fischell et al. | | 5,986,643 A | 11/1999 | Harvill et al. |
| 5,506,605 A | 4/1996 | Paley | | 5,999,185 A | 12/1999 | Kato et al. |
| 5,512,919 A | 4/1996 | Araki | | 6,004,134 A | 12/1999 | Marcus et al. |
| 5,515,078 A | 5/1996 | Greschler et al. | | 6,024,576 A | 2/2000 | Bevirt et al. |
| 5,524,637 A | 6/1996 | Erickson | | 6,037,927 A | 3/2000 | Rosenberg |
| 5,541,831 A | 7/1996 | Thomas | | 6,038,488 A | 3/2000 | Barnes et al. |
| 5,542,672 A | 8/1996 | Meredith | | 6,042,555 A | 3/2000 | Kramer et al. |
| 5,542,676 A | 8/1996 | Howe, Jr. et al. | | 6,047,080 A | 4/2000 | Chen et al. |
| 5,547,382 A | 8/1996 | Yamasaki et al. | | 6,050,962 A | 4/2000 | Kramer et al. |
| 5,548,694 A | 8/1996 | Frisken | | 6,059,506 A | 5/2000 | Kramer |
| 5,553,198 A | 9/1996 | Wang et al. | | 6,062,865 A | 5/2000 | Bailey |
| 5,559,412 A | 9/1996 | Schuler | | 6,062,866 A | 5/2000 | Prom |
| 5,565,840 A | 10/1996 | Thorner et al. | | 6,084,587 A | 7/2000 | Tarr et al. |
| 5,575,761 A | 11/1996 | Hajianpour | | 6,088,017 A | 7/2000 | Tremblay et al. |
| 5,577,981 A | 11/1996 | Jarvik | | 6,104,379 A | 8/2000 | Petrich et al. |
| 5,580,249 A | 12/1996 | Jacobsen et al. | | 6,110,130 A | 8/2000 | Kramer |
| 5,584,701 A | 12/1996 | Lampotang et al. | | 6,111,577 A | 8/2000 | Zilles et al. |
| 5,587,937 A | 12/1996 | Massie et al. | | 6,120,465 A | 9/2000 | Guthrie et al. |
| 5,591,924 A | 1/1997 | Hilton | | 6,148,280 A | 11/2000 | Kramer |
| 5,592,401 A | 1/1997 | Kramer | | 6,160,489 A | 12/2000 | Perry et al. |
| 5,599,301 A | 2/1997 | Jacobs et al. | | 6,162,190 A | 12/2000 | Kramer |
| 5,600,348 A | 2/1997 | Bartholow et al. | | 6,195,592 B1 | 2/2001 | Schuler |
| 5,607,157 A | 3/1997 | Nagashima | | 6,219,032 B1 | 4/2001 | Rosenberg et al. |
| 5,607,308 A | 3/1997 | Copperman et al. | | 6,222,523 B1 | 4/2001 | Harvill et al. |
| 5,609,485 A | 3/1997 | Bergman et al. | | 6,239,784 B1 | 5/2001 | Holmes |
| 5,609,607 A | 3/1997 | Hechtenberg et al. | | 6,275,213 B1 | 8/2001 | Tremblay et al. |
| 5,616,030 A | 4/1997 | Watson | | 6,323,837 B1 | 11/2001 | Rosenberg |
| 5,623,582 A | 4/1997 | Rosenberg | | 6,413,229 B1 | 7/2002 | Kramer et al. |
| 5,625,551 A | 4/1997 | Mitarai et al. | | 6,428,490 B1 | 8/2002 | Kramer et al. |

| | | |
|---|---|---|
| 6,497,672 B2 | 12/2002 | Kramer |
| 6,538,634 B1 | 3/2003 | Chui et al. |
| RE38,242 E | 9/2003 | Engel et al. |
| 6,876,891 B1 | 4/2005 | Schuler et al. |
| 6,885,361 B1 | 4/2005 | Harvill et al. |
| 7,215,326 B2 | 5/2007 | Rosenberg |
| 7,681,579 B2 | 3/2010 | Schwartz |
| 2002/0072814 A1 | 6/2002 | Schuler et al. |
| 2002/0107573 A1 | 8/2002 | Steinberg |
| 2002/0168618 A1 | 11/2002 | Anderson et al. |
| 2003/0032876 A1 | 2/2003 | Chen et al. |
| 2003/0069719 A1 | 4/2003 | Cunningham et al. |
| 2004/0009459 A1 | 1/2004 | Anderson et al. |
| 2004/0015070 A1 | 1/2004 | Liang et al. |
| 2004/0086175 A1 | 5/2004 | Parker et al. |
| 2004/0234933 A1 | 11/2004 | Dawson et al. |
| 2005/0196740 A1 | 9/2005 | Moriyama |
| 2006/0173338 A1 | 8/2006 | Ma et al. |
| 2006/0211940 A1 | 9/2006 | Antonelli et al. |
| 2006/0290695 A1 | 12/2006 | Salomie |
| 2007/0027733 A1 | 2/2007 | Bolle et al. |
| 2007/0043285 A1 | 2/2007 | Schwartz |
| 2007/0049817 A1 | 3/2007 | Preiss et al. |
| 2007/0148625 A1 | 6/2007 | Biltz et al. |
| 2007/0231779 A1 | 10/2007 | Santhanam et al. |
| 2009/0018808 A1 | 1/2009 | Bronstein et al. |
| 2009/0310847 A1 | 12/2009 | Matsuzaki et al. |
| 2011/0092804 A1 | 4/2011 | Schoenefeld et al. |

FOREIGN PATENT DOCUMENTS

| | | |
|---|---|---|
| EP | 0 393 683 | 10/1990 |
| EP | 0 456 103 | 11/1991 |
| EP | 0 489 469 | 6/1992 |
| EP | 0 316 763 | 8/1992 |
| EP | 0 567 215 | 10/1993 |
| EP | 0 571 827 | 12/1993 |
| EP | 0 624 861 | 11/1994 |
| EP | 0 626 634 | 11/1994 |
| EP | 0 623 066 | 7/1997 |
| EP | 0 632 709 | 3/2002 |
| FR | 2592514 A1 | 12/1985 |
| GB | 2 195 808 | 4/1988 |
| GB | 2 252 656 A | 8/1992 |
| GB | 2 288 686 | 10/1995 |
| JP | 03-98080 | 4/1991 |
| WO | WO91/06935 | 5/1991 |
| WO | WO 91/11775 | 8/1991 |
| WO | WO 93/04625 | 3/1993 |
| WO | WO 93/08517 | 4/1993 |
| WO | WO 93/14483 | 7/1993 |
| WO | WO 9318475 | 9/1993 |
| WO | WO 94/25948 | 11/1994 |
| WO | WO 95/02233 | 1/1995 |
| WO | WO95/10080 | 4/1995 |
| WO | WO 95/32459 | 11/1995 |
| WO | WO 96/16389 | 5/1996 |
| WO | WO96/28800 | 9/1996 |
| WO | WO 99/38141 | 7/1999 |

OTHER PUBLICATIONS

Torsen Butz et al. Pre- and Intra-operative Planning and Simulation of Percutaneous Tumor Ablation Medical Image Computing and Computer Assisted Intervention Â MICCAI 2000 Lecture Notes in Computer Science, LNCS, Springer, Berlin, DE. vol. 1935, Feb. 11, 2004, pp. 317-326, XP019001272.

Nakao M et al. Haptic reproduction and interactive visualization of a beating heart for cardiovascular surgery simulation. International Journal of Medical Informatics, Elsevier Scientific Publishers, Shannon, Ireland. vol. 68, No. 1-3 Dec. 18, 2002.

J. S. Denson and S. Abrahamson A Computer-Controlled Patient Simulator Apr. 21, 1969—vol. 208, No. 3, pp. 504-508 LA, USA.

D. Hon Ixion's Realistic Medical Simulations Virtual Reality World, vol. 2, No. 4 Jul. /Aug. 1994 pp. 58-62.

B.G Jackson L.B Rosenberg Force Feedback and Medical Simulation IOS Press and Ohmsha Jan. 19-22, 1995 pp. 147-151—CA, USA.

U.G. Kuhnapfel Realtime Graphical Computer Simulation for Endoscopic Surgery Symposium: Medicine Meets Virtual Reality II Jan. 27-30,1994 San Diego, CA, USA.

K.T. McGovern et al. The Virtual Clinic™, A Virtual Reality Surgical Simulator Symposium: Medicine Meets Virtual Reality II pp. 151-157 Jan. 27-30, 1994 San-Diego CA, USA.

M.D. Noar N. Soehendra Endoscopy Simulation Training Devices Endoscopy 1992, vol. 24 pp. 159-166 Georg Thieme Vering Stuttgart. New York.

M.D. Noar Robotics Interactive Simulation of RCP Sphincterotomy and EGD, Endoscopy 1992, vol. 24, pp. 539-541 Supplement 2 Georg Thieme Vering Stuttgart. New York.

O.C Zienkiewicz The Finite Element Method McGraw-Hill Book Company (UK) Limited, 1977, pp. 677-757.

Barfield et at Virtual Environments and Advanced Interface Design 1995 pp. 358-414.

Kuhnapfel et al. Endosurgery Simulations with KISMET Virtual Reality World, pp. 165-171 1995.

Massie et al. The PHANTOM Haptic Interface: A Device for Probing Virtual Objects Proceedings of the ASME Winter Annual Meeting, Symposium on Haptic Interfaces for Virtual Environment and Teleoperator Systems, Chicago, IL Nov 1994.

Bailie Gastrointestinal Endoscopy: Time for Change Scott Med J. Feb. 1989; 34 (1): 389-90.

Iwata et al. Volume Haptization IEEE 1993, pp. 16-18.

Anon. VR in Medicine VR News: April, 1996 vol. 5, Issue 3.

Office Action for U.S. Appl. No. 12/224,314 dated Apr. 29, 2011.

US Final Office Action for U.S. Appl. No. 12/224,314, mailed on Dec. 1, 2011.

Vidal, "Simulation of Image Guided Needle Puncture: Contribution to Real-time Ultrasound and Fluoroscopic Rendering, and Volume Haptic Rendering", School of Computer Science, Bangor University, United Kingdom Jan. 1, 2008, pp. 1-230.

Office Action issued by the United States Patent and Trademark Office for U.S. Appl. No. 12/224,314 dated May 31, 2012.

Office Action issued by the United States Patent and Trademark Office for U.S. Appl. No. 13/015,343 dated Jun. 7, 2012.

Notice of Allowance issued by the United States Patent and Trademark Office for U.S. Appl. No. 12/224,314 dated Feb. 19, 2013.

Yoshitaka, Adachi et al. Intermediate Interpretation for Stiff Virtual Objects Proceedings of the Virtual Reality Annual International Symposium (VRAIS' 95) Technical Research Center, Suzuki Motor Corporation, Yokohama, Japan.

Peter K Allen et al. Acquisition and Interpretation of 3-D Sensor Data from Touch Dept. of Computer Science, Columbia University, NY CH2813-4/89/0000/0033/$01.00 1989 IEEE pp. 33-40.

Fumihito Arai et al. Intelligent Assistance in Operation of Active Catheter for Minimum Invasive Surgery. Nagoya University—Nagoya, Japan Kinjo University—Nagoya, Japan IEEE International Workshop on Robot and Human Communication 0-7803-2002-6/94 $4.00 1994 IEEE.

Daniel Bachofen et al. Enhancing the Visual Realism of Hysteroscopy Simulation Book Series: Studies in Health Technology and Informatics—Book Medicine meets Virtual Reality 14: Accelerating Change in Health Care: Next Medical Toolkit vol. 119/2005 pp. 31-36.

J. Baille et al. Use of Computer Graphics Simulation for Teaching of Flexible Sigmoidoscopy. Duke University Medical Center, North Carolina, USA. Endoscopy 3 vol. 23 May 1991 pp. 126-129.

David Baraff An Introduction to Physically Based Modeling: Ridged Body Simulation II—Nonpenetration Constraints Robotics Institute Carnegie Mellon Institute pp. 32-68 1997.

Adelstein et al. ASME Symposium 1992 Design and Implementation of a Force Reflecting Manipuladum for Manual Control Research. CA, USA.

J.H. Anderson et al. Da Vinci: A Vascular Catheterization and Interventional Radiology-Based Training and Patient Pretreatment Planning Simulator (Abstract) JVIR Supplement, Journal of Vascular and Interventional Radiology, vol. 7, No. 1, Part 2. Jan.-Feb. 1996 Washington, US.

J. Batter and F. Brooks, Jr. Grope-1: A Computer Display to the Sense of Feel 1972 North Carolina, USA.

M. Bostrom et al. Design of an Interactive Lumbar Puncture Simulator With Tactile Feedback IEEE Neutral Network Counsel Virtual Reality Annual International Symposium Conference Sep. 18-22, 1993; Seattle, Washington U.S.

M. Bostrom Design of Hardware for Simulating Lumbar Puncture with Force Feedback Thayer School of Engineering, Dartmouth College. Mar. 17, 1993.

F. P. Brooks, et al. Project Grope—Haptic Displays for Scientific Visualization ACM, Computer Graphics, vol. 24, No. 4. Aug. 1990—Chapel Hill NC, USA.

Burdea et al. A Distributed Virtual Environment with Dextrous Force Feedback Informatique '92, International Conference Interface to Real and Virtual Worlds, Rutgers University EC2 Conference Mar. 23-27, 1992, NJ, USA.

J. Capowski, Remote Manipulators as a Computer Input Device University Microfilms, A XEROX Company, Ann Arbor, Michigan UMI Dissertation Services. 1971—Michigan USA.

J. S. Denson and S. Abrahamson A Computer-Controlled Patient Simulator Apr. 21, 1969—vol. 208, No. 3 pp. 504-508 LA, USA.

D. Gillies and C. Williams, London UK An Interactive Graphic Simulator for the Teaching of Fibrendoscopic Techniques Eurographics '87 Elsevier Science Publishers B.V North Holland pp. 127-138.

Gillies, Haritsis and Williams Computer Simulation for Teaching Endoscopic Procedures Endoscopy, Supplement II, vol. 24, Jul. 1992. pp. 455-550.

A. Haritsis D. Gillies CH. Williams (Eurographics) Realistic Generation and Real Time Animation of Images of the Human Colon Computer Graphics Forum vol. II No. 3, conference issue—Sep. 7-11, 1992. NNC Blackwell.

Haritsis 1992 (Hellenic) A.Haritsis D. Gillies CH. Williams Computer Simulation: New Horizons in Endoscopy Teaching Hellenic Journal of Gastroenterology 1992 pp. 54-63 London UK.

G. Higgins, et al. Higgins 1995 (Surg. Tech. Int'l IV) Virtual Reality Surgery: Implementation of a Coronary Angioplasty Training Simulator. University Medical Press, San Francisco, 1995. pp. 379-383.

D. Hon Ixion's Laparoscopic Surgical Skills Simulator Symposium: Medicine Meets Virtual Reality II Jan. 27-30, 1994 San Diego, USA.

D. Hon Ixion's Realistic Medical Simulations Virtual Reality World, vol. 2, No. 4 Jul. / Aug. 1994 pp. 58-62.

H. Iwata Artificial Reality with Force-feedback: Development of Desktop Virtual Space with Compact Master Manipulator. ACM SIGGRPAH 1990 Computer Graphics & Interactive Techniques vol. 24, No. 4. pp. 165-170 Aug. 6-10, 1990.

B.G Jackson LB Rosenberg Force Feedback and Medical Simulation IOS Press and Ohmsha Jan. 19-22, 1995 pp. 147-151—CA, USA.

P.J. Kilpatrick Kilpatrick Thesis 1976 pp. 11-27 The Use of a Kinesthetic Supplement in an Interactive Graphics System. The University of North Carolina, USA.

Kotoku et al. A Force Display System for Virtual Environments and its Evaluation International Workshop on Robot and Human Communication IEEE Sep. 1-3, 1992 pp. 246-251—Ibaraki, Japan.

U.G. Kuhnapfel Realtime Graphical Computer Simulation for Endoscopic Surgery Symposium: Medicine Meets Virtual Reality II Jan. 27-30, 1994 San Diego, CA, USA.

U.G.Kuhnapfel et al. Endo surgery simulations with KISMET: a flexible tool for surgical instrument design, operation room planning and VR technology based abdominal surgery training. Virtual Reality World '95, Conference Stuttgart, Germany Computerwoche Verlag, 1995. pp. 165-171.

B. Marcus Feedback Technology and Virtual Environments pp. 87-95 Jul. 1-3, 1992—1992 International Conference on Artificial Reality and Telexistence (ICAT 1992) pp. 87-95.

Mark et al. Adding Force Feedback to Graphics Systems: Issues and Solutions Aug. 4-9, 1996 ACM SIGGRAPH 1996 Computer Graphics Proceedings, Annual Conference Chapel Hill. North Carolina, USA.

T.H. Massie Design of a Three Degree of Freedom Force-Reflecting Haptic Interface MIT, USA Thesis—pp. 6-38 May 18, 1993 Submitted May 17, 1993.

K.T. McGovern et al. The Virtual Clinic™, A Virtual Reality Surgical Simulator Symposium: Medicine Meets Virtual Reality II pp. 151-157 Jan. 27-30, San-Diego CA, USA.

D. Meglan Making Surgical Simulation Real ACM SIGGRAPH Computer Graphics pp. 37-39 Nov. 1996 Rockville, MD, USA.

Meglan et al. The Teleos Virtual Environment Toolkit for Simulation-Based Surgical Education Interactive Technology and the New Paradigm for Healthcare Proceeding of MMVR 3, IOS Press and Ohmsha pp. 346-351. Jan. 17-20, 1996 San-Diego CA, USA.

J. R. Merril The Future of Virtual Reality, Medicine, and the Information Superhighway Journal of Knowledge Engineering & Technology, vol. 7, No. 1 Spring 1994 pp. 33-35 MD, USA.

Merril et al. Photorealistic Interactive Three-Dimensional Graphics in Surgical Simulation Interactive Technology and the New Paradigm for Healthcare Proceeding of MMVR 3, IOS Press and Ohmsha pp. 244-252 Jan. 19-22, 1995 San Diego, USA.

Merril et al. Surgical Simulation Using Virtual Reality Technology: Design, Implementation, and Implications. Surgical Technology International III 1994 pp. 53-60. Published by Universal Medical Press, CA, USA.

Merril et al. Virtual Heart Surgery—Trade Show and Medical Education 1994 Virtual Reality World pp. 55-57 Jul./Aug. 1994 MD, USA.

Merril et al Cyber Surgery—Cutting Costs, Sewing Benefits The Virtual Reality Special Report, Miller Freedman Inc. Summer 1994 pp. 39-42 MD, USA.

Minsky et al. Feeling and Seeing: Issues in Force Display ACM 1990 pp. 235-243 CA, USA.

M.D. Noar N. Soehendra Endoscopy Simulation Training Devices Endoscopy 1992, vol. 24 pp. 159-166 Georg Thieme Vexing Stuttgart. New York.

M.D. Noar Robotics Interactive Simulation of RCP Sphincterotomy and EGD, Endoscopy 1992, vol. 24, pp. 539-541 Supplement 2 Georg Thieme Vexing Stuttgart. New York.

A. M. Noll Man-Machine Tactile Communication Polytechnic Institute of Brooklyn, Jun. 1971, pp. 1V-X111 and 1-87.

Ernest M. Otani Software Tools for Dynamic and Kinematic Modeling of Human Emotion Department of Computer & Information Science Technical Reports (CIS) University of Pennsylvania, Jul. 1989, pp. 1-74.

M. Ouh-Young Force Display in Molecular Docking UNC, The University of North Carolina at Chapel Hill 1990, pp. 1-369.

J. Peifer, et al. Medicine Meets Virtual Reality, Health Care in the Information Age Applied Virtual Reality for Simulation of Endoscopic Retrograde Cholangio-Pancreatography IOM Press, Proceedings of Medicine Meets Virtual Reality 4, San Diego, California, Jan. 17-20, 1996, pp. 36-42.

S. Pieper et al. Stereoscopic Displays and Applications II Virtual environment system for simulation of leg surgery SPIE vol. 1457, Feb. 25-27, 1991, pp. 188-197.

S. Pieper et al. Interactive Graphics for Plastic Surgery: A task-level analysis and Implementation 1992 ACM Computer Graphics Special Issue on 1992 Symposium on Interactive 3D Graphics, Cambridge, MA Mar. 29-Apr. 1, 1992, pp. 127-134.

D. Popa Simulation of Lumbar Puncture Procedure using Force Feedback in Virtual Environments Thayer School of Engineering, Dartmouth College, Hanover, New Hampshire, Jun. 1994, pp. 1-134.

Preminger et al. Medicine Meets Virtual Reality, Health Care in the Information Age Virtual Reality Surgical Simulation in Endoscopic Urologic Surgery IOM Press, Proceedings of Medicine Meets Virtual Reality 4, San Diego, California, Jan. 17-20, 1996, Chapter 19, pp. 157-163.

L.B Rosenberg, B.G Jackson Foot-Based Interfaces to Virtual Environments Using the Immersion Interface Box (TM) Virtual Reality and Persons With Disabilities, Second Annual International Conference, Jun. 8-10, 1994, pp. 145-148.

L.B Rosenberg "Virtual Fixtures"—Perceptual overlays enhance operator performance in telepresence tasks Stanford University, Aug. 1994. pp. 1-214.

M. A. Russo The Design and Implementation of a Three Degree of Freedom of Freedom Force Output Joystick MIT, May 11, 1990. pp. 1-131.

Salisbury et al. Haptic Rendering: Programming Touch Interaction with Virtual Objects Symposium on Interactive 3D Graphics, 1995 ACM, pp. 123-130.

S. S. Saliterman A Computerized Simulator for Critical-Care Training: New Technology for Medical Education Scientific session of the Mayo Medical School Alumni Society, Nov. 4, 1989, pp. 968-978.

B. Schmult et al. Application Areas for a Force-Feedback Joystick DSC vol. 49. Advances in Robotics, Mechatronics, and Haptic Interfaces ASME 1993, pp. 47-54.

Singh et al. Design of an Interactive Lumbar Puncture Simulator With Tactile Feedback IEEE International Conference on Robotics and Automation, May 8-13, 1994, pp. 1734-1739.

M. Stanley and J. Colgate Computer Simulation of Interacting Dynamic Mechanical Systems using Distributed Memory Parallel Processors ASME Winter Annual Meeting, Symposium on Haptic Interfaces for Virtual Environment and Teleoperator Systems, Nov. 8-13, 1992, pp. 55-61.

Sharon A. Stansfield Visually-Guided Haptic Object Recognition University of Pennsylvania 1987 UMI, pp. 1-216.

I. Sutherland The Ultimate Display for Production Proceedings of the IFIP Congress 1965, pp. 506-508.

D. Terzopoulos and D. Metaxas Dynamic 3D Models with Local and Global Deformations: Deformable Superquadrics IEEE Transactions on Pattern Analysis and Machine Intelligence, vol. 13, No. 7, Aug. 30, 1990, pp. 703-714.

Williams, Baillie, Gillies, Borislow and Cotton Teaching Gastrointestinal Endoscopy by Computer Simulation: a Prototype for Colonoscopy and ERCP Gastrointestinal Endoscopy vol. 36, No. 1., 1990, pp. 49-54.

C. M. Winey III Computer Simulated Visual and Tactile Feedback as an aid to Manipulator and Vehicle Control MIT, Jul. 31, 1981, pp. 1-132.

O.C. Zienkiewicz the Finite Element Method McGraw Hill Book Company (UK) Limited, 1977, pp. 677-757.

Beth A. Marcus Hands on: Haptic Feedback in Surgical Simulation Exos, Inc., Jan. 27-30, 1994, pp. SIMB 004163-SIMB 004174.

Virtual Reality and Medicine the Cutting Edge SIG Advanced Applications, Inc. Conference and Exhibition, Sep. 8-11, 1994, The New York Hilton.

Daane et al. A $100 Surgical Simulator for the IBM PC Interactive Technology and the New Paradigm for Healthcare Jan. 1995—pp. 79-80.

Strutz et al. 3-D Guided Endoscopic Surgery of Paranasal Sinusese Surgical Technology International IV, Oct. 1995, pp. 195-197.

Stone Haptic Human-Computer Interaction—Haptic Feedback: A Brief History from Telepresence to Virtual Reality Haptic Human-Computer Interaction, First International Workshop, Glasgow, UK Proceedings. Aug. 31-Sep. 1, 2000.

Loftin et al. A Virtual Environment for Laparoscopic Surgical Training Medicine Meets Virtual Reality II: Interactive Technology & Healthcare, Jan. 1994.

Durrani et al. Advanced Endoscopic Imaging: 3-D Laparoscopic Endoscopy Surgical Technology International III, Oct. 1994.

Johnston et al. Assessing a Virtual Reality Surgical Skills Simulator Stud Health Technol Inform. 1996; 29:608-17.

Barfield et al Virtual Environments and Advanced Interface Design 1995 pp. 358-414.

Bejczy et al. Controlling Remote Manipulators Through Kinesthetic Coupling Computers in Mechanical Engineering Jul. 1983, pp. 48-60.

Beer-Gable Computer Assisted Training in Endoscopy (C.A.T.E.): From a Simulator to a Learning Station.Endoscopy 1992; 24:suppl. 2: pp. 534-538.

Kuenhapfel et al. CAD-Based Graphical Computer Simulation in Endoscopic Surgery Institute fur Angewandte Informatik, Kernforschumgszentr urn Karlsruhe Germany, Oct. 1994.

Campos et al. A Robotic Haptic System Architecture University of Pennsylvania, Dept. of Computer & Information Science Technical Reprot No. MS-CIS-00-51 1990.

Merril et al. Changing the Focus of Surgical Training Virtual Reality World, Mar./Apr. 1995, pp. 56-60.

Szabo et al. Choreographed Instrument Movements During Laparoscopic Surgery: Needle Driving, Knot Tying, and Anastomosis Techniques. Medicine Meets Virtual Reality II; Interactive Technology & Healthcare, Jan. 1994. pp. 216-217.

Dumay Cybersurgery Medicine Meets Virtual Reality II. Interactive Technology & Healthcare, Jan. 1994.

Greenleaf DataGlove and Datasuit: Virtual Reality Technology Applied to the Measurement of Human Movement. Medicine Meets Virtual Reality II. Interactive Technology & Healthcare, Jan. 1994, pp. 63-69.

Burdea et al. Dextrous Telerobotics with Force Feedback—An Overview, Part 1: Human Factors Rutgers—The State University of New Jersey, Dept. of Electrical and Computer Engineering, Robotica (1991) vol. 9, pp. 171-178.

Online reference dated May 31, 1995, updates chapter 13 of the AutoCAD Release 13 Developer's Guide dated Apr. 14, 1995.

Christensen Bringing Telematics Into Health Care in The European Communities Medicine Meets Virtual Reality II. Interactive Technology & Healthcare, Jan. 1994, 21-23.

Marcus et al. Exos Research on Master Controllers for Robotic Devices NASA Technical Reports Server NTRS, pp. 238-245 Jan 1, 1992.

Merril VR for Medical Training and Trade Show "Fly-Pape": Virtual Reality World, May/Jun. 1994, pp. 53-57.

Baumann et al. Force Feedback for Virtual Reality Based Minimally Invasive Surgery Simulator Medicine Meets Virtual Reality IV: Health Care in the Information Age, Jan. 1996.

Jason Fritz Haptic Rendering Techniques for Scientific Visualization Jason P. Fritz Thesis at University of Delaware Fall 1996.

Rosenberg et al. A Haptic Interface for Virtual Simulation of Endoscopic Surgery Medicine Meets Virtual Reality IV: Health Care in the Information Age, Jan. 1996 pp. 371-387.

Ho et al. IGES and PDES, The Current Status of Product Data Exchange Status Dept. of Computer Science, Univ. Of Mo-Rolla, Rolla MO, 1988 IEEE, pp. 210-216.

Hooper The Interactive Assembly and Computer Animation of Reconfigurable Robotic Systems Mechanical Engineering Dept. The University of Texas at Austin. 1990.

Rosenberg Louis B. Human Interface Hardware for Virtual Laparoscopic Surgery Interactive Technology and the New Paradigm for Health Care Immersion Corp. Santa Clara, CA. Chapter49, pp. 322—Jan. 1995.

Funda et al. Image-guided Command and Control of a Surgical Robot Medicine Meets Virtual Reality II. Interactive Technology & Healthcare, Jan. 1994.

Jaramaz et al. Integrating Finite Element Analysis Into Pre-Operative Surgical Planning and Simulation of Total Joint Replacement Surgery Medicine Meets Virtual Reality II. Interactive Technology & Healthcare, Jan. 1994, pp. 34-37.

Merck & Co. An Introduction to the Robotic Endoscopy Simulator 1989.

Filerman et al. Issues in the Design of Tactile Input Devices for Mechanical CAD Systems Massachusetts Institute of Technology, Artificial Intelligence Laboratory 1989.

Hon Ixion's Laparoscopic Surgical Skills Simulator Medicine Meets Virtual Reality II. Interactive Technology & Healthcare, Jan. 1994.

Kilpatrick The use of a Kinesthetic Supplement in an Interactive Graphics System Xerox University Microfilms 1976.

Kuhnapfel et al. Endosurgery Simulations with KISMET Virtual Reality Workd, pp. 165-171 1995.

Immersion Corporation Laparoscopic Impulse Engine Impulse Engine 2000™ Software Development Kit (ver. 1.0)(Immersion) Immersion Corporation—Version 1.0 Mar. 1995.

McKensie et al. Lasers in Surgery and Medicine Wessex Regional Medical Physics Service and Department of Otolaryngology, vol. 29, No. 6, pp. 619-641 1984.

Massie et al. The PHANTOM Haptic Interface: A Device for Probing Virtual Objects Proceedings of the ASME Winter Annual Meeting, Symposium on Haptic Interfaces for Virtual Environment and Teleoperator Systems, Chicago, IL Nov. 1994.

Poston et al. The Medical Reality Sculptor Medicine Meets Virtual Reality II. Interactive Technology & Healthcare, Jan. 1994. pp. 174-176.

Satava Medical Virtual Reality: The Current Status of the Future Medicine Meets Virtual Reality IV: Health Care in the Information Age, Jan. 1996.

Merril et al. Virtual Reality for Trade Shows and Individual Physician Training Virtual Reality Systems, pp. 40-44 Spring 2004.

Flynn Virtual Reality and Virtual Spaces Find a Niche in Real Medicine; Simulated Surgery on a Computer—This Won't Hurt. New York Times Jun. 5, 1995.

Hannaford et al. Performance Evaluation of a Six-Axis Generalized Force-Reflecting Teleoperator IEEE May/Jun. 1991, vol. 21, No. 3 pp. 620-633.

Merril Presentation Material: Medicine Meets Virtual Reality II. Interactive Technology & Healthcare, Jan. 1994.

Immersion Human Interface Corporation Immersion PROBE and Personal Digitizer Programmer's Technical Reference Manual: Immersion Probe and Personal Digitizer May 19, 1994.

Durlach Psychophysical Considerations in The Design of Human-Machine Interfaces for Teleoperator and Virtual-Environment Systems Medicine Meets Virtual Reality II. Interactive Technology & Healthcare, Jan. 1994 pp. 45-47.

Hubner et al. Real-Time Volume Visualization of Medical Image Data for Diagnostic and Navigational Purposes in Computer Aided Surgery Proc., Computer Assisted Radiology, CAR'96 Paris, pp. 751-756 Jun. 26-29, 1996.

Merril et al. Revealing the Mysteries of the Brain with VR Virtual Reality Special Report, Winter 1994, pp. 61-65.

Neisius et al. Robotic Telemanipulator for Laparoscopy 1995 IEEE-EMBC and CMBEC Theme 5: Neuromuscular Systems/Biomechamics, pp. 1199-1200.1995.

Medical World News Virtual Reality Shapes Surgeon's Skills Medical World News, Feb. 1994, pp. 26-27.

Hon Tactile and Visual Simulation: A Realistic Endoscopy Experience Medicine Meets Virtual Reality: Discovering Applications for 3-D Multi-Media Interactive Technology in the Health Sciences, Jun. 4-7, 1992.

Johnson Tactile Feedback Enhancement to Laparoscopic Tools Medicine Meets Virtual Reality II. Interactive Technology & Healthcare, Jan. 1994.

Fischer et al. Tactile Feedback for Endoscopic Surgery Interactive Technology and the New Paradigm for Healthcare, Jan. 1995.

Peine et al. A Tactile Sensing and Display System for Surgical Applications Interactive Technology and the New Paradigm for Healthcare, Jan. 1995 pp. 283-288.

Hunter et al. Teleoperated Microsurgical Robot and Associated Virtual Environment Medicine Meets Virtual Reality II. Interactive Technology & Healthcare, Jan. 1994.

Holler et al. Teleprescence Systems for Application in Minimally Invasive Surgery Medicine Meets Virtual Reality II. Interactive Technology & Healthcare, Jan. 1994.

Satava Virtual Reality Surgical Simulator: The First Steps Medicine Meets Virtual Reality: Discovering Applications for 3-D Multi-Media Interactive Technology in the Health Sciences—Jun. 4-7, 1992.

Frolich et al. The Responsive Workbench: A Virtual Working Environment for Physicians Interactive Technology and the New Paradigm for Healthcare, Jan. 1995, pp. 118-119.

Doyle et al. The Virtual Embryo: VR Applications in Human Developmental Anatomy Medicine Meets Virtual Reality II: Interactive Technology & Healthcare, Jan. 1994, pp. 38-41.

Baille Gastrointestinal Endoscopy: Time for Change Scott Med J. Feb. 1989; 34 (1): 389-90.

Song et al. Tissue Cutting in Virtual Environments Interactive Technology and the New Paradigm for Healthcare, Jan. 1995.

Gyeong-Jae et al. Tissue Cutting in Virtual Environments Interactive Technology and the New Paradigm for Healthcare, Jan. 1995 359-364J.

Sukthankar Towards Virtual Reality of "Tissue Squeezing": A Feasibility Study Medicine Meets Virtual Reality II: Interactive Technology & Healthcare, Jan. 1994, pp. 182-186.

Adachi Touch and Trace on the Free-Form Surface of Virtual Object Proceedings of IEEE Virtual Reality Annual International Symposium—Sep. 18-22, 1993 Seattle, WA pp. 162-168.

CH Products CH Products Virtual Pilot Control Yoke 1993.

Hoffman Virtual Reality and the Medical Curriculum: Integrating Extant and Emerging Technologies Medicine Meets Virtual Reality II: Interactive Technology & Healthcare, Jan. 1994 pp. 73-76.

Burdea et al. Virtual Reality Technology Chap. 6, pp. 221-242. Wiley-Interscience 2003.

Iwata et al. Volume Haptization IEEE 1993, pp. 16-18.

Anon. VR in Medicine VR News; Apr. 1996 vol. 5, Issue 3.

Ota et al. Virtual Reality in Surgical Education ComputBiol Med., Mar. 1995, 25(2): 127-37.

MacDonald et al. Virtual Reality Technology Applied to Anesthesiology Interactive Technology and the New Paradigm for Healthcare, Jan. 1995.

Bell et al. The Virtual Reality Modeling Language, version 1.0 Specification 1996.

Merril Why I Simulate Surgery . . . Virtual Reality World, Nov./Dec. 1994, pp. 54-57.

* cited by examiner

SYSTEM AND METHOD FOR PERFORMING COMPUTERIZED SIMULATIONS FOR IMAGE-GUIDED PROCEDURES USING A PATIENT SPECIFIC MODEL

CROSS REFERENCE TO RELATED APPLICATIONS

This application is a Continuation-in-part application of U.S. application Ser. No. 12/224,314, filed Aug. 22, 2008, which is a National Phase Application of PCT International Application No. PCT/IL2008/000056, International filing date Jan. 13, 2008, claiming priority of U.S. Provisional Patent Application No. 60/880,415, filed Jan. 16, 2007.

BACKGROUND OF THE INVENTION

The clinical practice is replacing, wherever possible, traditional open surgical procedures with less invasive techniques that require, however, indirect, image-based feedback. In image-guided procedures, such as vascular catheterization, angioplasty and stent placement the physician needs to identify anatomical structures in images. These procedures are difficult to master without extensive training, yet training on humans may be fatal. Accordingly, simulation systems for image-guided procedures may train a physician without unnecessary risk and may also serve as pre-operative planning tool or post-operative assessment tool. Most of the simulation systems are based on predefined models of anatomical structures and are not patient specific. Accordingly, such systems cannot be used for accurately planning an operation on a particular patient prior to performing the operation or for post assessment of the operation. A more progressive simulation system is a patient-specific simulation system that uses patient-specific medical image data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
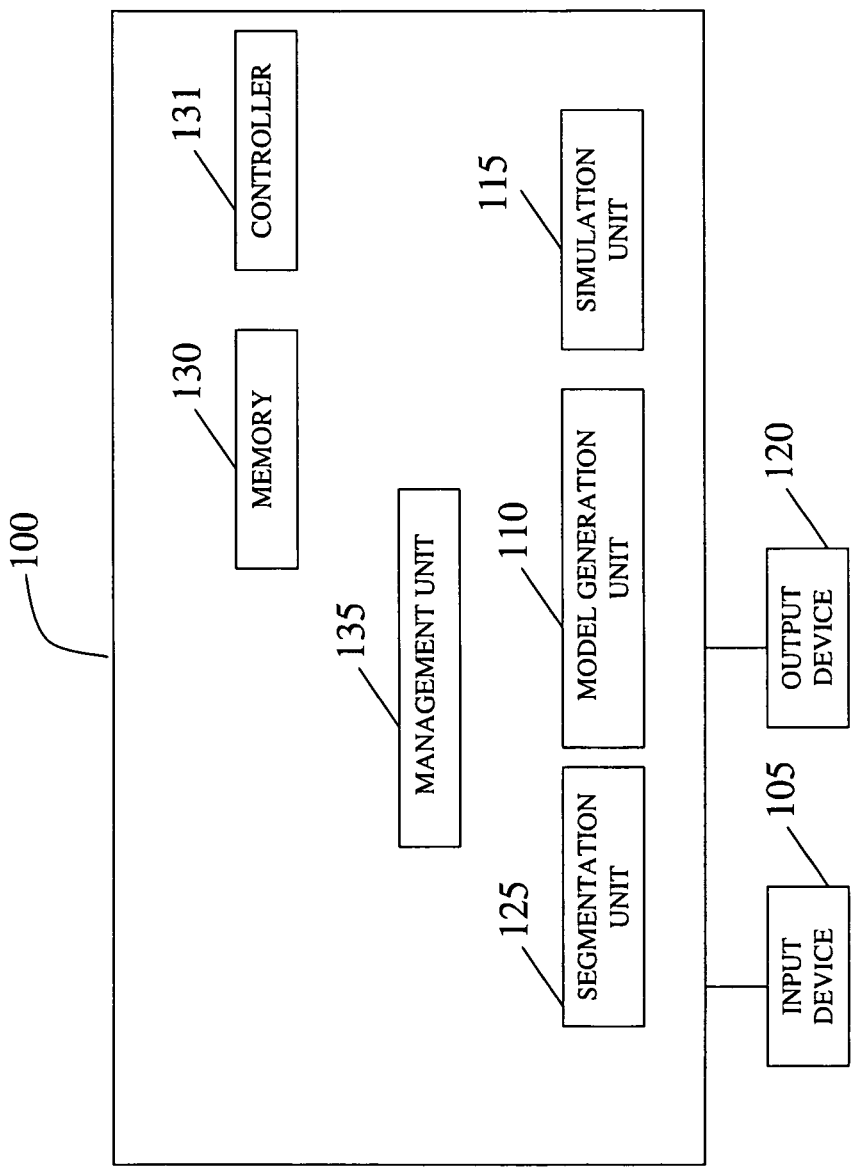
FIG. 1 shows an exemplary system for simulating an image-guided procedure according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Embodiments of the invention are directed to patient-specific computerized simulations for image-guided procedures. The method may include producing a digital model of an anatomical structure based on medical image data received from a scan of a subject. The subject may be for example a patient that is about to undergo an image-guided procedure. Usually the medical image data received, for example, from a CT system or any other suitable imaging system does not include or cover the entire area of interest for simulation but rather a more limited area or region. For example, a scan performed prior to a stenting procedure may typically cover areas in close vicinity to the area about to be treated. As will be understood to a person skilled in the art, usually, a scan of a patient is performed as a diagnostic tool to diagnose, for example, pathology in a specific anatomical region and therefore usually such a scan covers only the area that diseased, damaged or modified and its immediate vicinity. An operation or procedure for treating the pathology may require passage through other anatomical regions not covered by the scan. A physician may wish to practice on the entire procedure prior to performing the operation and/or to perform post-procedure assessment. Accordingly, in order to enable a comprehensive simulation of the procedure, an anatomical model of additional regions may be desired.

According to embodiments of the invention, the method may include producing an extended model based on the digital model and extrapolated data representing adjacent sections of the anatomical structures not included in the medical image data. A graphical representation of the extended model may be displayed on a monitor and the extended model may be viewed with additional information, such as models of tools. A physician may perform a computerized simulation of the image-guided procedure using the extended model as a pre-procedure of the actual surgery.

The medical image data may be patient specific medical images obtained from an imaging system such as computed tomography (CT), CT-fluoroscopy, fluoroscopy, magnetic resonance imaging (MRI), Ultrasound, positron emission tomography (PET) and X-ray. Embodiments of the invention may use as input the medical image data to produce 3D or 4D model of the anatomical structure, organ, and system and further an extended model including regions that are not presented in the medical images obtained from the imaging system.

The 3D model generated based on the image data may be, for example, a polygonal mesh representing the three-dimensional (3D) surfaces of the anatomical structure, a voxel mask of the structure volume or a patch surface, such as a 2D B-spline or the like. For ease of explanation, embodiments of the invention are described with respect to polygonal meshes. It should be however understood to a person skilled in the art that the invention is not limited to such models and other models are within the scope of the invention.

Reference is made to FIG. 1 showing an exemplary system 100 for simulating an image-guided procedure according to embodiments of the invention. System 100 may include an input unit 105, an output unit 120, a model generation unit 110, a simulation unit 115 and a management unit 135. System 100 may further include a memory 130 and a controller 131. Input unit 105 may receive medical image data and may deliver the medical image data to model generation unit 110 for producing a patient-specific model for simulation. The model may include extended portions representing areas of the anatomical structures that are were not presented in the medical image data used as input data. When a user performs a simulation, for example as a pre-procedure for an image-guided procedure, using simulation unit 115, a graphical representation of the model and the simulation process may be displayed on a monitor (not shown) of output unit 120.

Input unit 105 may interface with or receive medical image data from an imaging system (not shown) such as X-ray system, CT system, MRI system and/or an ultrasound imaging system. Input unit 105 may include a mouse, a keyboard, a touch screen or pad or any suitable input devices. Alternatively or additionally, input unit 105 may include a wired or wireless network interface card (NIC) that may receive data, for example, from the imaging system. According to some embodiments, input unit 105 may communicate with a system or server storing medical images such as a picture archiving communication system (PACS) and may obtain any relevant imaging information, data or parameters from such a system, server or application.

Model generation emit 110 may include components or modules for generating a digital model and its graphical representation, e.g., a 3D or 4D anatomical model of an anatomical structure, such as an organ vessel system or any other area of interest within the body. The model may be generated by model generation unit 110 according to information received from an imaging system, for example, a medical image received from a CT system via input unit 105. Simulation unit 115 may include components for generating a simulation of an image-guided procedure. According to embodiments of the invention, system 100 may further include a force feedback device (not shown) to simulate the perception of force when manipulating physical tools within the body.

Output unit 120 may include components for interfacing with a display screen to enable visual output or optionally a speaker or another audio device to enable audible output. Output unit 120 may include one or more displays, speakers and/or any other suitable output devices. Output unit 120 may communicate with any other component or unit of system 100 and accordingly may enable such units to communicate with external systems. Units 105, 110, 115 and 120 may be or may comprise software, hardware, firmware or any suitable combination thereof.

Controller 131 may be any suitable controller or processing unit, e.g., a central processing unit processor (CPU). Memory 130 may be any suitable memory component, device, chip or system and may store applications or other executable codes that may be executed by controller 131. For example, applications or modules implementing model generation and/or simulation may be loaded into memory 130 and executed by controller 131.

It will be recognized that system 100 as described herein is an exemplary system. According to embodiments of the invention, system 100 may be implemented on a single computational device or alternatively, in a distributed configuration, on two or more different computational devices. For example, model generation unit 110 may operate on a first computational device and managed by a first management unit whereas simulation unit 115 may operate on another computational device and managed by a second management unit that communicates with the first management unit. In another exemplary embodiment, management unit 135 may operate on a computational device, model generation unit 110 may operate on a second computational device and simulation unit 115 may operate on a third computational device.

Figure 2:
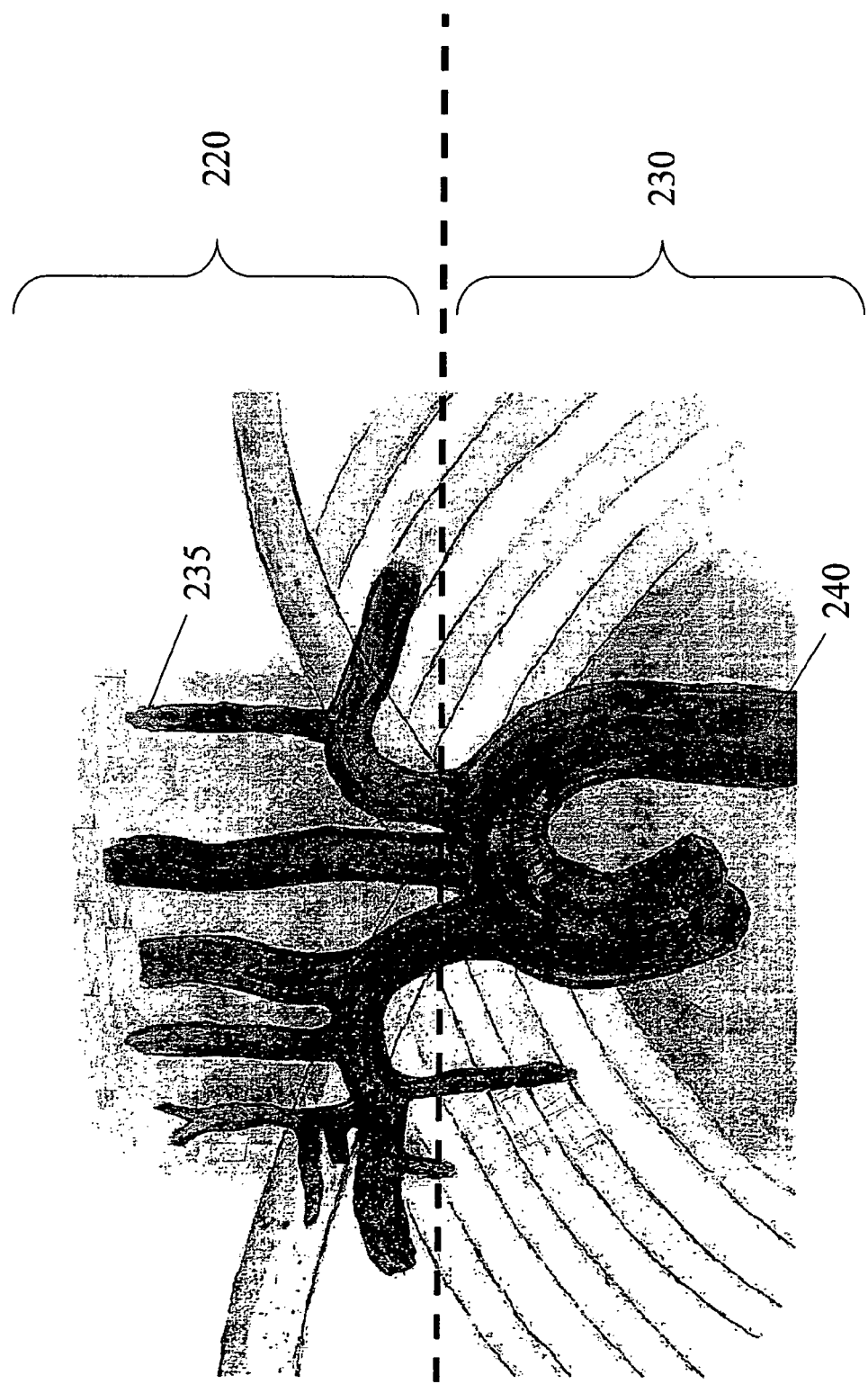
FIG. 2 shows an illustration of an exemplary anatomical structure helpful in understanding embodiments of the present invention.

Reference is made to FIG. 2 showing an exemplary illustration of an anatomical structure of a cardiovascular system helpful in understanding embodiments of the invention. Performing an image-guided procedure simulation, such as carotid stenting simulation, the user may practice navigation in the vasculature while experimenting with various catheters. Typically, the scan of the patient for diagnostic purposes is performed only in the direct vicinity of the lesion. Accordingly, a model for simulation that would use as input data such scans may not encompass all the areas through which that the physician should navigate to reach the lesion.

The illustration of FIG. 2 shows a top region 220 representing an area that was scanned by an exemplary imaging system and a bottom region 230 that was not scanned. Accordingly, the medical image data would include only the image of region 220. According to embodiments of the invention, in order to perform a full and/or comprehensive simulation of the procedure, an extended model for simulation may be produced representing both the scanned region 220 and the un-scanned region 230. According to embodiments of the invention, the portion of the model representing the scanned region may be generated from the medical image data of a specific subject and the model may be extrapolated to include representation of the un-scanned region. The extrapolation may include selecting from a set of pre-designed generic models representing anatomical structures the best match to represent the desired extended portion.

For example, in an angioplasty procedure, such as carotid stenting, in order to reach the left vertebral at point 235 where a lesion may exist, a catheter may be inserted into the aorta at the lower part of the patient's body and guided through point 240 on the way to the left vertebral. Accordingly, an extended model that includes the aorta may be desired for the simulated procedure.

Figure 3:
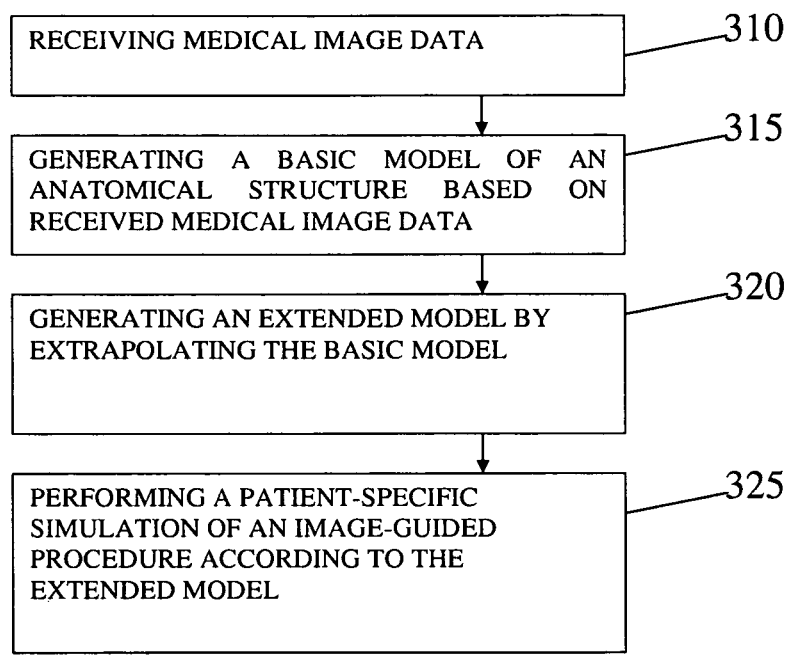
FIG. 3 is a flowchart diagram illustrating a method for simulating an image-guided procedure according to some embodiments of the present invention.
Figure 4A:
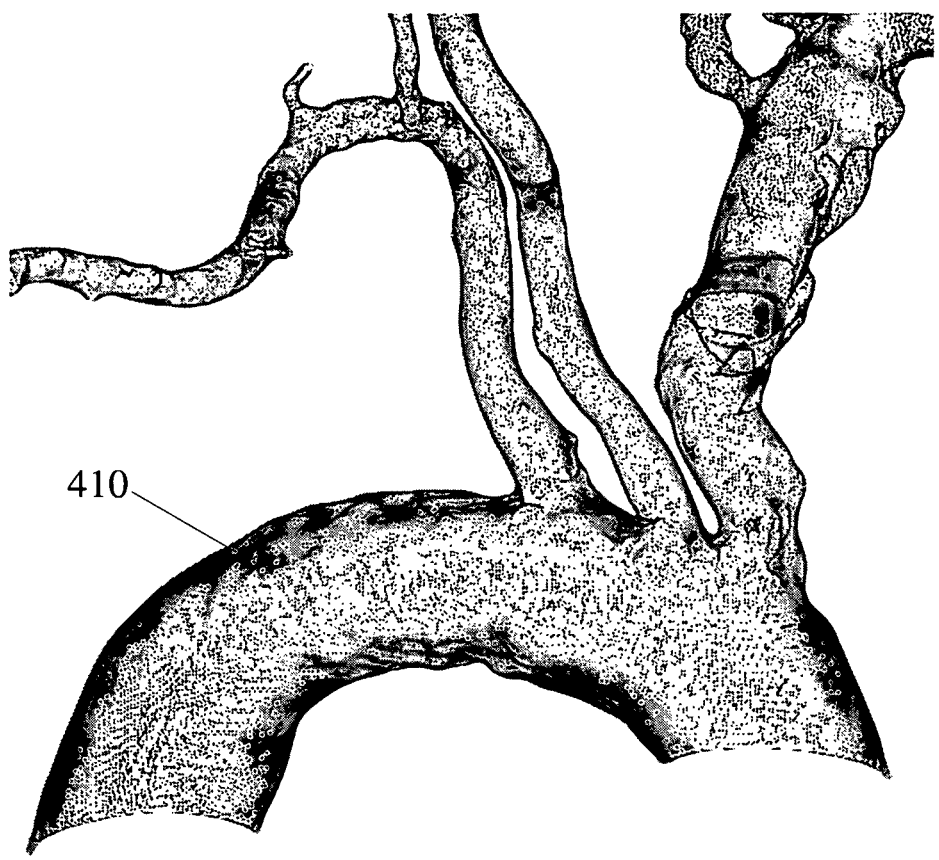
FIGS. 4A and 4B show graphical illustrations of an exemplary 3D digital model produced according to embodiments of the invention.
Figure 4B:
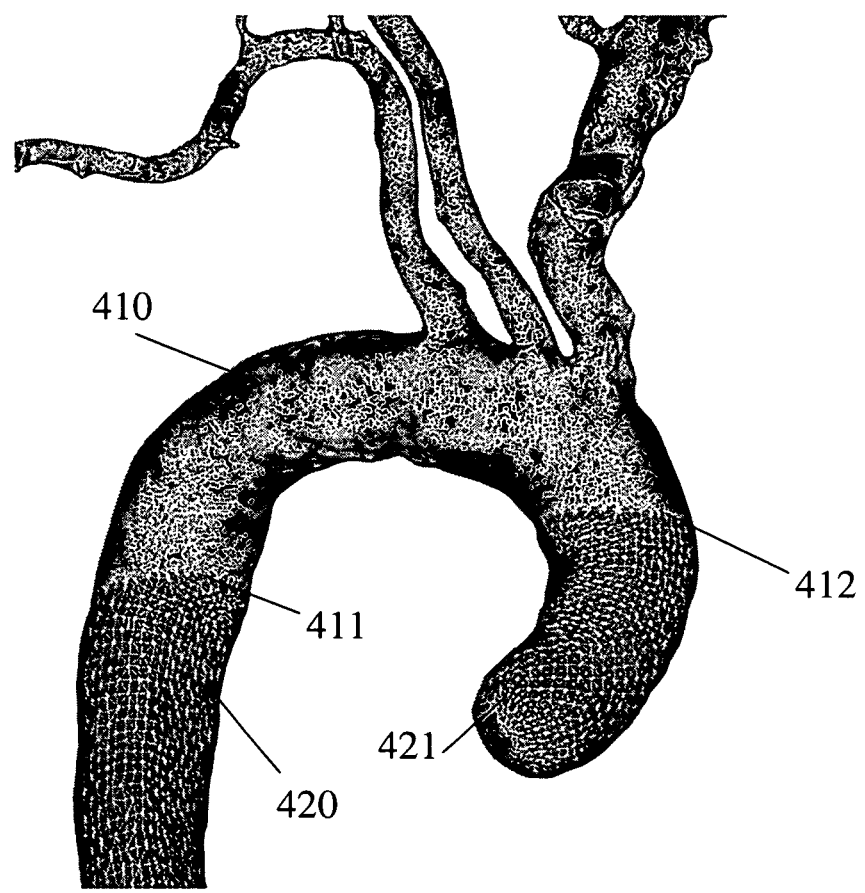

Reference is made to FIG. 3, which is an exemplary flowchart describing a method for simulating an image-guided procedure according to some embodiments of the present invention. Reference is additionally made to FIGS. 4A and 4B showing graphical illustrations of an exemplary 3D digital model produced according to embodiments of the invention. As shown by box 310, the method may include receiving medical image data of a subject. The medical image data may be received from an imaging or scanning system such as for example, CT or MRI scanners. As shown by box 315, the method may include processing the received image data and generating based on the processed data a model of the anatomical structure depicted in the medical image, which is patient specific. A model that includes only anatomical structure that is represented in the medical image data is also termed herein a basic model or an image-based model. FIG. 4A shows an exemplary image-based model 410 processed from CT data of a portion of the vasculature.

According to exemplary embodiments, the processing may include segmenting the medical image data. Segmentation involves partitioning of the image domain into non-overlapping regions that correspond to distinct anatomical structures and identifying the desired anatomical structures in the medical images. Other segmentation techniques, such as soft segmentation, probabilistic or Bayesian segmentations may enable overlapping regions. It will be recognized that embodiments of the invention are not limited in that respect, and any applicable segmentation or soft segmentation method may be used.

The segmentation process may be implemented using fully-automated algorithms, semi-automated algorithms with minimal input from the user, tailor-made algorithms where the user can explicitly specify the desired segmentation or by manual segmentation, using for example CAD tools. The output of the segmentation process includes identifying a portion of the image data as a set of voxels (a mask) that represents the desired anatomical structure volume. The processing of the data may further include generating the discretisized surfaces of this volume, also referred to as a boundary-representation (B-rep). These surfaces are commonly represented by polygonal meshes, although embodiments of the invention are not limited in this respect and other representations, such as spline surface patches or constructive solid geometry (CSG) representation or any mix thereof are likewise possible.

The processing may further include computation of center-lines of approximate-tubular sections of the polygonal mesh, e.g., blood vessels, intestines or colon. In the exemplary image-based or basic model of FIG. 4A, the center-lines represent the center-lines of different vessels. The vessel center-lines may be defined by cubic splines, e.g., Catmul-Rom splines or any other suitable mathematical function. The processing may further include, additionally or alternatively, computation of the radii of the various vessels.

According to some embodiments, generating the image-based model of the anatomical structure depicted in the medical image may include the process of registration. Registration may be defined as the alignment of multiple data sets into a single coordinate system such that the spatial locations of corresponding points would coincide. The segmented portions of the anatomical structure may be properly located and rotated with respect to other models representing the anatomy of the patient. Such other models may be generic or patient-specific models as described herein. For example, registering a simulated blood vessel may include properly locating it with respect to digital models of the bone structure, internal organs or lungs of the patient. Registration may enable presenting a real-life image of the subject being treated. Registration may further enable rotating or otherwise relocating or repositioning in space a simulated model while preserving the relative position of organs, sections, regions or parts in the simulated model.

According to some embodiments, the procedures, tasks and/or functions associated with the segmentation, generation of polygonal meshes, computing the centerlines and/or radii may be performed in the segmentation stage or at simulation start up by either model generation unit 110 or simulation unit 115. It should be understood by a person skilled in the art that although the described herein are typically performed, other implementations may exist. For example, simulation unit 115 may generate a model using as input the set of voxels without performing surface rendering and/or computation of centerlines or radii and/or registration. It will be recognized that embodiments of the invention are not limited by the exemplary method or system described for generating an image-based basic model of an anatomical structure and other methods may be used for generating such a model without departing from the scope of the invention.

Returning back to FIG. 3, according to embodiments of the invention, the method, may include generating or calculating an extended model of the anatomical structure by extrapolating boundaries of the basic model depicting the medical image data (box 320). Then, the method may include performing a patient-specific simulation of an image-guided procedure according to the extended model (box 325). According to embodiments of the invention, parts, sections or regions missing from a medical image data of a subject may be simulated or modeled by extrapolating a model calculated from the medical image data. FIG. 4B shows an extended model produced by identifying to boundaries in basic model 410 of FIG. 4 and extrapolating the basic model 410 and adding extrapolated sections 420, 421 as explained in detail with respect to FIGS. 5, 6, 7A and 7B.

Figure 5:
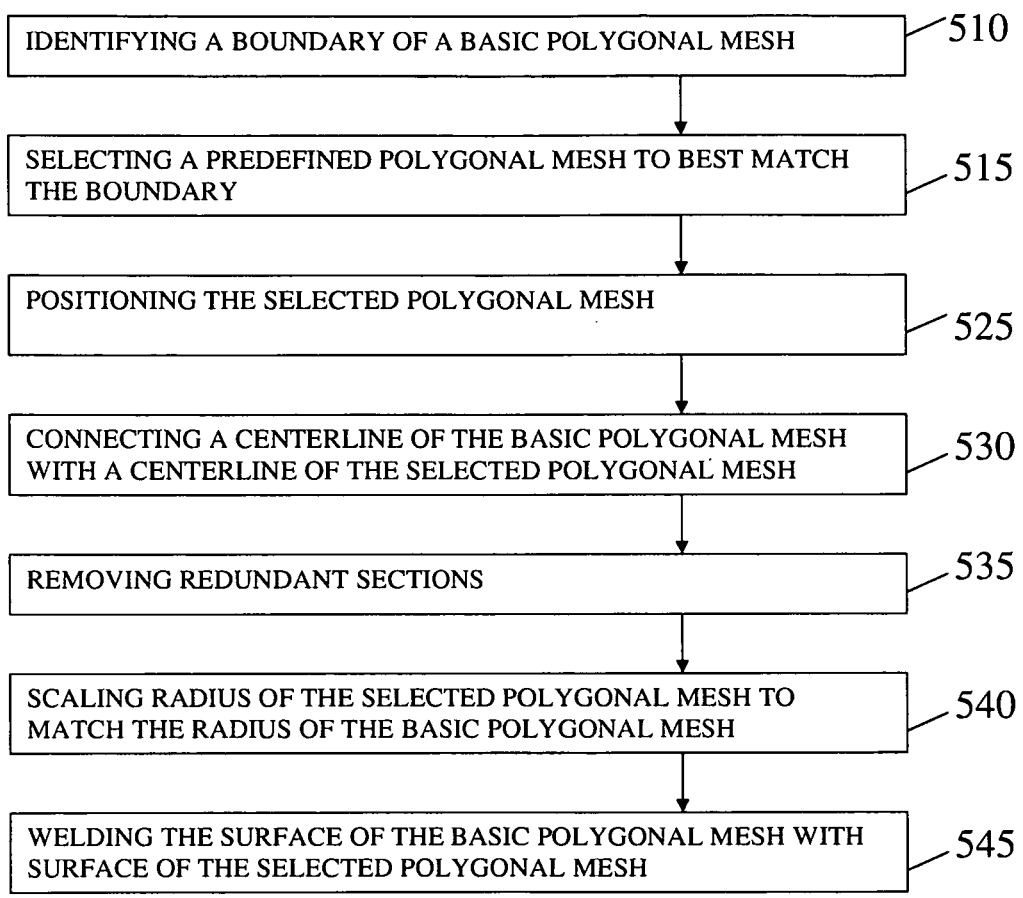
FIG. 5 is a flowchart diagram illustrating an exemplary method for generating an extended model for client-specific simulation for image-guided procedures according to some embodiments of the present invention.
Figure 6:
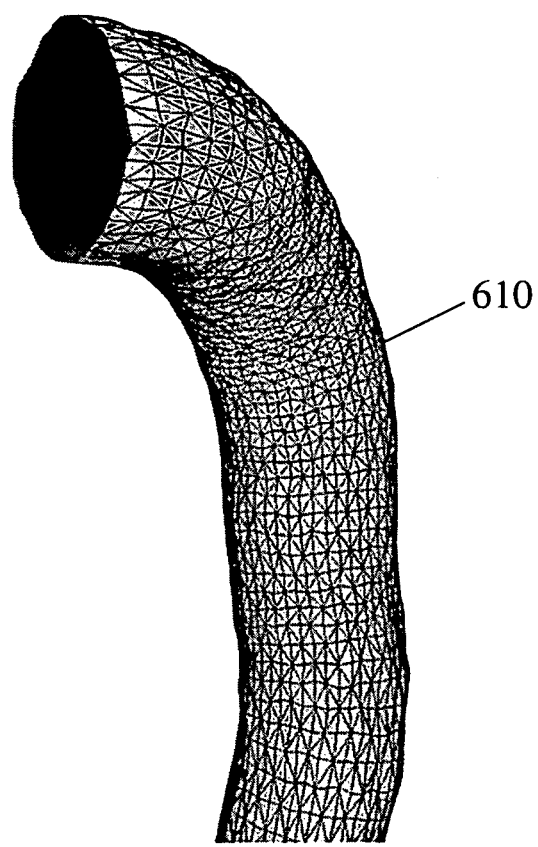
FIG. 6 is a graphical illustration of an exemplary 3D generic model for extended models according to embodiments of the invention.
Figure 7A:
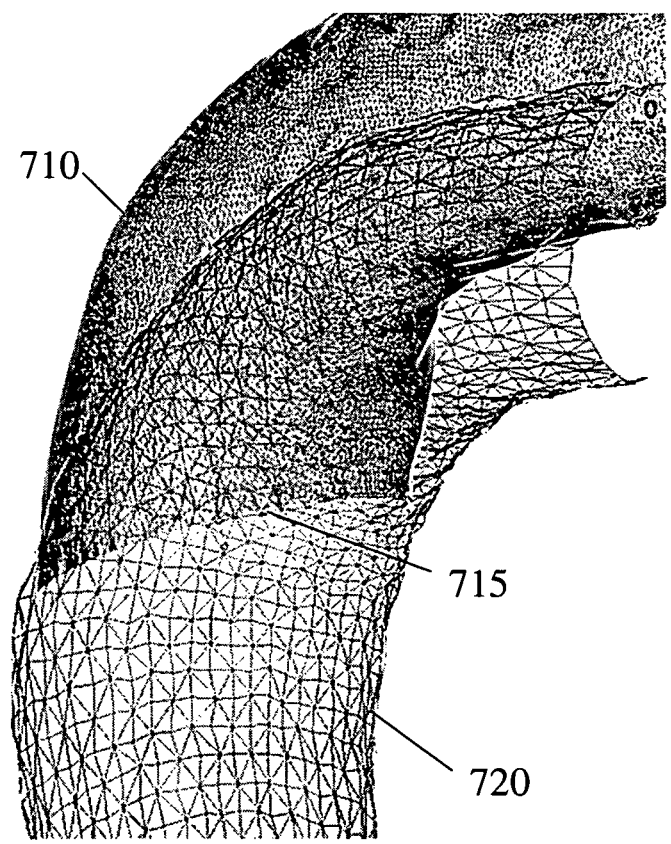
FIGS. 7A and 7B show graphical illustrations of an exemplary 3D digital model produced according to embodiments of the invention.
Figure 7B:
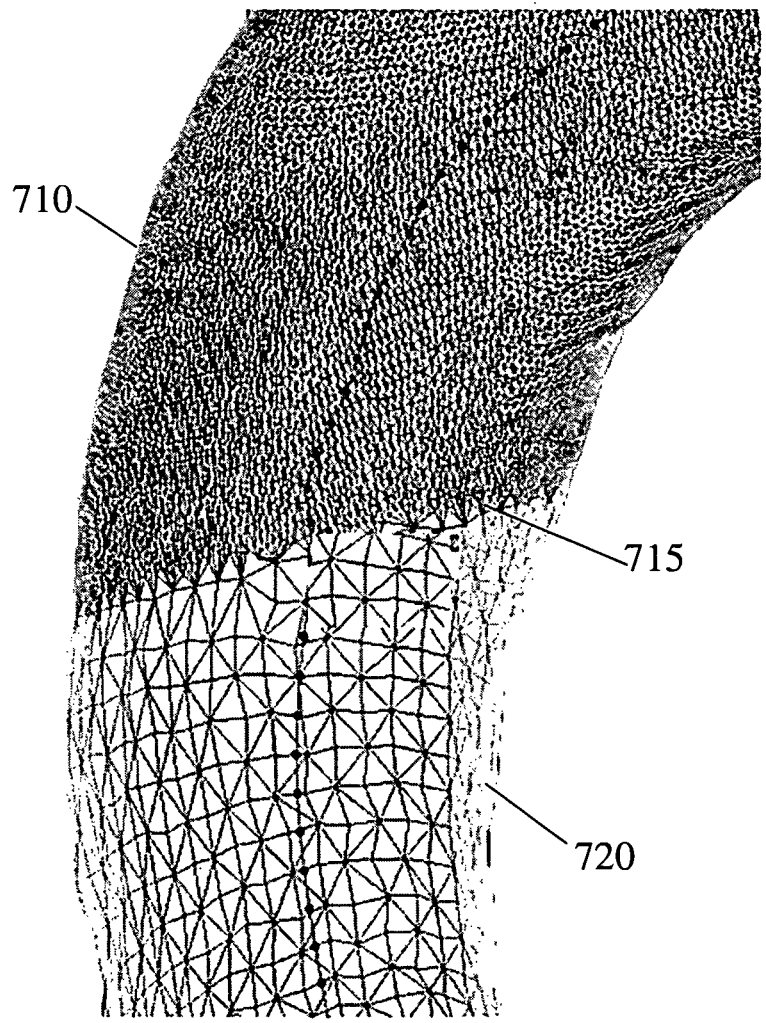

Reference is made to FIG. 5 which is an exemplary flow-chart describing a method of generating an extended model for patient-specific simulation of an image-guided procedure according to embodiments of the invention. Reference is additionally made to FIGS. 6, 7A and 7B showing graphical illustrations of exemplary polygonal meshes produced according to embodiments of the invention. Embodiments of the invention may be applicable to various anatomical structures, systems, sections, regions, organs or parts thereof. Accordingly, the method described herein with reference to FIG. 5 may be applicable to generating an extended model of any such anatomical structure. However, for the sake of simplicity and clarity the discussion below refers to as an exemplary illustration to the vasculature. It will be noted that the embodiments of the invention are not limited in this respect. For ease of explanation, embodiments of the invention are described with respect to polygonal meshes. It should be however understood to a person skilled in the art that the invention is not limited in to such models and other models are within the scope of the invention.

According to the exemplary embodiment of FIG. 5, the input to the extrapolation phase is an image-based model that is represented as a polygonal mesh representing 3D surfaces of the image-based model, properly registered and rotated including further the vessel centerlines represented by splines. As shown by box 510, the method may include identifying one or more boundaries of the polygonal mesh, such as mesh 410 of FIG. 4A or mesh 710 of FIG. 7A. For example, the boundaries of the polygonal mesh may be detected by detecting edges associated with only one polygon. The detected edges may be grouped into one or more connectivity components where each component is associated with an open boundary of a single vessel that may potentially require extrapolation.

According to an exemplary embodiment of the invention, the method may include selecting for each boundary that requires extrapolation a generic pre-designed model represented for example as a polygonal mesh, such as mesh 610 of FIG. 6, to be used as a model for the extended section (box 515). The generic model may be selected from a set of pre-designed models to best match the open boundary edge according to certain parameters and rules. The generic model may be represented by a polygonal mesh to be used as an approximation or estimation of a region or section not included in an image-based model generated according to the medical image data.

The selected generic model, e.g., polygonal mesh, may be retrieved from a database, library or any other repository of generic meshes. Such repository may store a large number of polygonal meshes or other models, each corresponding, for example, to a particular vessel at a particular anatomical location and has known physical characteristics such as length and radius. According to embodiments of the invention, a repository of pre-generated models or polygonal meshes may be accessed in order to obtain a polygonal mesh closest to or best matching an open boundary of the polygonal mesh representing the basic or image-based model. For example, polygonal mesh 610 may be chosen as a basis or starting point for generating an extended section 720 for section 710 in boundary 715 as illustrated in FIGS. 7A and 7B. The selection of the best match may be performed manually or automatically based on a predefined set of geometric attributes of the segmented model. Alternatively, the selection may be made by using both manual and automated operations. According to embodiments of the invention, the system may send a user a recommendation to select a specific generic model and the user may them manually confirm of deny the recommendation.

Then, as shown by box 525, the exemplary embodiment may include positioning the selected mesh in alignment with the boundary. An exemplary alignment method may utilize centerlines associated with a library of predefined extrapolation meshes and may include computing a tangent vector to the centerline at the edge of the segmented region near the boundary. Such tangent vector may be computed with relation to a point at the edge or boundary detected. Next, a point on a centerline of the predefined or generated polygonal mesh may be located. Such point may be related to or have a tangent vector that is close or identical to the tangent value computed for the boundary of the simulated organ. Using points with similar tangent vector may enable positioning the predefined polygonal mesh in correct orientation with respect to the simulated organ or the polygonal mesh representing it.

Then, as shown by box 530, the exemplary embodiment may include connecting the centerline of the polygonal mesh representing the image-based model with the centerline of the selected predefined polygonal mesh as illustrated by FIG. 7A. The connection of the centerlines may be done in accordance with the computed tangent values as described herein. The centerlines may be joined, bonded or welded such that the points with close, similar or identical tangent value coincide to ensure that the basic model and the added section may be similarly positioned or orientated in a 3D space.

Next, as shown by box 535, the exemplary embodiment may include removing of redundant sections. As the registration of the boundary of the basic model represented by the basic polygonal mesh is known, a virtual box, sphere or other structured volume may be defined such that it may contain the polygonal mesh. Accordingly, parts of the added section extending beyond or outside such virtual volume may be removed as they may be redundant. Alternatively, only vertices of the selected a mesh which lie inside such virtual box or volume may be kept for further processing as described herein.

As shown by box 540, the exemplary embodiment may include scaling the radius of the selected generic mesh to better match the radius of the basic polygonal mesh representing the basic model. The shape of the selected predefined polygonal mesh may not fit or perfectly match that of the boundary or open end to which it is connected. Moreover, although aligned or orientated as described herein, the centerlines of the polygonal mesh representing the basic model and the selected polygonal mesh representing the extended section may still be spatially apart. Additionally, for example, in the case of a simulated blood vessel, a cross-section of the predefined, extrapolated section being matched to an open end may not be a perfect circle, nor does its centerline guaranteed to be an exact mathematical centerline of a cylinder. Accordingly, a different scaling factor, possibly for every angle around the centerline may be applied.

Then, as shown by box 545, the exemplary embodiment may include welding the surface of selected polygonal mesh with the surface of the basic polygonal mesh. For example, the basic polygonal mesh and the selected predefined polygonal mesh may be joined such that a continuous surface is produced as illustrated by FIG. 7B. Vertices from the boundary of the basic polygon mesh and from the corresponding selected mesh of the extended section may be joined and represented by a single vertex while redundant vertices may be removed from the model. The exemplary method described above may be repeated for each open end, boundary or edge of the basic model that needs to be extended.

It should be understood to a person skilled in the art that the predefined generic models representing the extended anatomy may be represented in many methods and models, different or similar to the basic model. According to some embodiments, the model representing the extended regions may be different than the basic model. Accordingly, the model representing an extrapolated region may be converted to another format or representation to comply with the basic model. The extrapolated region in the converted representation may then be welded or otherwise connected to the basic model.

Alternatively, according to other embodiments of the invention, a polygonal mesh or another suitable model representing the extrapolated section may be generated procedurally. The procedural generation of the extrapolated sections or regions may include identifying key attributes of the basic model such as the boundaries to be extended, relevant radii, centerlines and the like. For example, centerlines of a generated basic model of a blood vessel may be extrapolated according to a first set of rules. A non-limiting example for the first set of rules may include rules directed to smoothly curving the extrapolation towards a pre-determined direction. Then, the radii function of the simulated blood vessel model may be extrapolated, for example, by using a second set of rules. A non-limiting example for the second set of rules may include varying the radius smoothly from the identified value of the basic model toward a predefined value (e.g. 1 cm) for a predefined length and then smoothly changing the radius to zero at a predefined distance from the tip (e.g. 2 mm from the tip). Then, using the extrapolated centerline and radius-function, a unified polygonal mesh representing both the basic model and its extrapolation may be generated.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of performing computerized simulations of image-guided procedures, the method comprising:
producing a digital image-based model of an anatomical structure in a patient based on medical image data obtained from the patient, the digital image-based model including a first 3D polygonal mesh representing the medical image data;
producing, based on the image-based model and data representing anatomical structures not included in the medical image data, an extended model that represents the anatomical structure in the patient and adjacent anatomical regions not included in the medical image data, wherein producing the extended model comprises:
automatically selecting from a set of pre-designed generic 3D polygonal meshes a second 3D polygonal mesh representing anatomical structures not included in the medical image data, and
positioning the second 3D polygonal mesh in alignment with a boundary of the first 3D polygonal mesh;
displaying a graphical representation of the extended model; and
performing a computerized simulation of an image-guided procedure using the extended model.

2. The method of claim 1, wherein the medical image data is received from a scan of a patient and the image-based model is a patient-specific model related to the patient.

3. The method of claim 1, wherein producing the image-based model comprises producing the first 3D polygonal mesh.

4. The method of claim 3, wherein producing the extended model comprises:
identifying a boundary of the first 3D polygonal mesh;
automatically selecting the second 3D polygonal mesh such that it represents an extended section that best matches the boundary, based on spatial location and geometric parameters; and
combining the boundary of the first 3D polygonal mesh with the second 3D polygonal mesh.

5. The method of claim 4, wherein combining the boundary comprises:
computing a center-line of a tubular section associated with the boundary; and
connecting the centerline of the tubular section of the first 3D polygonal mesh with a centerline of the second 3D polygonal mesh.

6. The method of claim 5 further comprising:
removing digital data associated with a redundant section; and
scaling the second 3D polygonal mesh such that a radius of the second 3D polygonal mesh matches a radius of the first 3D polygonal mesh.

7. The method of claim 1, wherein producing the extended model comprises:
identifying a boundary of the image-based model;
identifying attributes at the boundary;
generating a procedurally-generated model based on one or more of the attributes as an extension of the image-based model, wherein the extended model includes both the image-based model and the procedurally-generated model.

8. The method of claim 7, wherein identifying the attributes at the boundary includes determining a value for a radius at the boundary and defining a centerline of a section associated with the boundary.

9. The method of claim 1, wherein producing the extended model comprises:
identifying a boundary of the image-based model, the image-based model being represented in a first format;
identifying attributes at the boundary; and
selecting a predefined model to be the extended model, the predefined model being represented in a second format different than the first format.

10. The method of claim 9, further comprising:
converting the second format of the model into the first format.

11. The method of claim 1, wherein producing the image-based model comprises:
segmenting the medical image data;
identifying a portion of the image data that represents a desired volume of the anatomical structure; and
generating a boundary-representation of the desired volume.

12. The method of claim 1, wherein the medical image data is received from a CT or MRI scanner.

13. The method of claim 1, wherein the anatomical structure is a blood vessel.

14. A system for simulating an image-guided procedure, the system comprising:
a model generation unit to produce a digital image-based model of an anatomical structure in a patient based on received medical image data obtained from the patient and to produce, based on the image-based model and data representing anatomical structures not included in the medical image data, an extended model that represents the anatomical structure in the patient and adjacent anatomical regions not included in the medical image data, wherein the digital image-based model includes a first 3D polygonal mesh representing the medical image data and wherein producing the extended model comprises:
automatically selecting from a set of pre-designed generic 3D polygonal meshes a second 3D polygonal mesh representing anatomical structures not included in the medical image data, and
positioning the second 3D polygonal mesh in alignment with a boundary of the first 3D polygonal mesh; and
a simulation unit to display a graphical representation of the extended model and to perform a computerized simulation of an image-guided procedure using the extended model.

15. The system of claim 14, wherein the medical image data is received from a scan of a patient and the image-based model is a patient-specific model related to the patient.

16. A non-transitory computer readable storage medium having instructions stored thereon that when executed by a computing device result in:

producing a digital image-based model of an anatomical structure in a patient based on medical image data obtained from the patient, the digital image-based model including a first 3D polygonal mesh representing the medical image data;

producing, based on the image-based model and data representing anatomical structures not included in the medical image data, an extended model that represents the anatomical structure and adjacent anatomical regions not included in the medical image data, wherein producing the extended model comprises:

automatically selecting from a set of pre-designed 3D generic polygonal meshes a second 3D polygonal mesh representing anatomical structures not included in the medical image data, and positioning the second 3D polygonal mesh in alignment with a boundary of the first 3D polygonal mesh;

displaying a graphical representation of the extended model; and performing a computerized simulation of an image-guided procedure using the extended model.

17. The computer readable storage medium of claim 16, wherein the instructions that result in producing the extended model further comprise instructions that when executed by the computing device result in:

identifying a boundary of the first 3D polygonal mesh;

automatically selecting the second 3D polygonal mesh such that it represents an extended section that best matches the boundary, based on spatial location and geometric parameters; and combining the boundary of the first 3D polygonal mesh with the second 3D polygonal mesh.

18. The computer readable storage medium of claim 17, wherein the instructions that result in combining the boundary further comprise instructions that when executed by the computing device result in:

computing a center-line of a tubular section associated with the boundary; and connecting the centerline of the tubular section of the first 3D polygonal mesh with a centerline of the second 3D polygonal mesh.

19. The computer readable storage medium of claim 18, further comprising instructions that when executed by the computing device result in:

removing digital data associated with a redundant section; and scaling the second 3D polygonal mesh such that a radius of the second 3D polygonal mesh matches a radius of the first 3D polygonal mesh.

20. The computer readable storage medium of claim 16, wherein the instructions that result in producing the image-based model of the anatomical structure further comprise instructions that when executed by the computing device result in:

segmenting the medical image data;

identifying a portion of the image data that represents a desired volume of the anatomical structure; and generating a boundary-representation of the desired volume.

\* \* \* \* \*